United States Patent Office

3,558,566
Patented Jan. 26, 1971

3,558,566
MIXED POLYMERIZATES FROM VINYL CHLORIDE AND FUMARIC ACID ESTERS AND PROCESS FOR THEIR PREPARATION
Thomas Balwé, Johann Bauer, and Joseph Heckmaier, Burghausen, Upper Bavaria, Germany, assignors to Wacker-Chemie G.m.b.H., Munich, Germany, a corporation of Germany
No Drawing. Filed Nov. 27, 1968, Ser. No. 779,617
Claims priority, application Germany, Dec. 5, 1967,
P 17 45 566.2
Int. Cl. C08f *1/11, 15/24*
U.S. Cl. 260—78.5          3 Claims

ABSTRACT OF THE DISCLOSURE

Mixed polymerizates containing from 80% to 100% by weight of a copolymerizate of vinyl chloride and fumaric acid esters of aliphatic alcohols characterized in that at least part of said aliphatic alcohols are monohydric aliphatically-unsaturated alcohols containing at least 11 carbon atoms as well as the process of preparing the mixed polymerizates. The mixed polymerizates form clear molded bodies of high tensile strength and elasticity.

THE PRIOR ART

It is known that mixed polymerizates from vinyl chloride and fumaric acid alkyl esters containing from 14 to 44 carbon atoms are polymerizates of vinyl chloride with so-called "internal plasticizing." That is, they are suitable for the preparation of molded bodies and coatings which exhibit a more or less high impact strength even without a content of plasticizer which does not enter into a reaction with the polymerizate. Impact stable molded bodies and coats, prepared from mixed polymerizates of vinyl chloride with fumaric acid alkyl esters containing up to approximately 24 carbon atoms, however, have the disadvantage that their optical clarity is unsatisfactory. This cloudiness is less in molded bodies and coatings which have been prepared from the presently known mixed polymerizates of vinyl chloride with fumaric acid alkyl esters containing more than 24 carbon atoms. However, at the same time, the mechanical properties of such molded bodies and coatings as, for instance, the tensile strength and elasticity are considerably worse.

OBJECTS OF THE INVENTION

An object of the present invention is the production of mixed polymerizates of vinyl chloride with fumaric acid esters of aliphatic alcohols which have a high optical clarity coupled with high tensile strength and elasticity.

Another object of the present invention is the obtention of mixed polymerizates containing from 80% to 100% by weight of a copolymerizate of vinyl chloride and fumaric acid esters of aliphatic alcohols characterized in that at least part of said aliphatic alcohols are monohydric aliphatically-unsaturated alcohols containing at least 11 carbon atoms.

A further object of the present invention is the development of a process for the obtention of the above mixed polymerizates.

These and other objects of the present invention will become more apparent as the description thereof proceeds.

DESCRIPTION OF THE INVENTION

It has now been discovered that these objects can be achieved in the production of mixed polymerizates containing from 80% to 100% by weight of a copolymerizate of vinyl chloride and fumaric acid esters of aliphatic alcohols characterized in that at least part of said aliphatic alcohols are monohydric aliphatically-unsaturated alcohols containing at least 11 carbon atoms.

The mixed polymerizates of vinyl chloride and fumaric acid esters of the invention produce molded bodies and coatings of high optical clarity and at least equal mechanical properties, for instance, with view to tensile strength, elasticity, and resistance against mechanical stress at low temperatures, as obtained with molded bodies and coatings from mixed polymerizates of vinyl chloride and fumaric acid alkyl esters containing up to 24 carbon atoms.

The alcohols with aliphatic-unsaturation and at least 11 carbon atoms, which are utilized for esterification of fumaric acid to form the fumaric esters required for the preparation of the mixed polymerizates of the invention, may be either straight or branched, primary, secondary or tertiary alcohols. Usefully, they contain only one aliphatic-unsaturation, preferably, an aliphatic double bond. Preferentially, they contain 12 to 26, preferably 14 to 20 carbon atoms. Examples for suitable alcohols are alkenols such as undecenol, dodecenol, tetradecenol, palmitoleyl alcohol, oleyl alcohol, eicosenol, erucyl alcohol, carnaubenol, hexacosenol, citronellol and phytol. For the preparation of the fumaric acid esters mixtures of different unsaturated alcohols can be used.

These ester groups which, in addition to the ester groups which are derived from monohydric alcohols with aliphatic-unsaturation, are present in the fumaric acid esters required for the preparation of the mixed polymerizates of the invention, are derived preferably from saturated, monohydric, aliphatic alcohols with 11 to 26 carbon atoms, preferably 14 to 20 carbon atoms. Examples for such alcohols are alkanols such as lauryl alcohol, myristyl alcohol, cetyl alcohol, and stearyl alcohol. For the preparation of the fumaric acid esters, mixtures of different saturated alcohols can be employed. Commercially prepared mixtures of alcohols derived from sperm oil are particularly preferred as alcohols utilized in the preparation of the fumaric acid esters, due to their easy accessibility and because, with them, particularly good results are obtained. These commerically prepared mixtures of alcohols derived from sperm oil are prepared by a process of saponification of sperm oil. The saponification product is a mixture of fatty acids and unsaturated alcohols, in particular oleyl alcohol. The unsaturated alcohols may be separated from the mixture, but preferably, by careful hydrogenation the fatty acids present in the mixture are reduced to give aliphatic saturated, monohydroxy alcohols (alkanols) with from 11 to 26 carbon atoms, predominately from 14 to 20 carbon atoms, without effecting the unsaturated alcohols. This mixture of alcohols may be admixed with other saturated alcohols. At least one percent by weight, preferably at least 2% by weight and preferably no more than 50% by weight of the ester groups of the fumaric acids in the mixture polymerizates of the invention should be derived from monohydric alcohols having aliphatic-unsaturation and at least 11 carbon atoms. The preferred fumaric acid esters of aliphatic alcohols are therefore mixtures of fumaric acid esters of alcohols consisting of from about 1% to 50% of alkenols having from 11 to 20 carbon atoms and from about 99% to 50% of alkanols having from 14 to 20 carbon atoms.

The fumaric acid esters of mixtures of alcohols can be prepared according to any desired method, for example, by means of esterification of fumaric acid with the mixtures of unsaturated+saturated alcohols in the presence of strong acids. Due to the fact that they are more readily accessible, fumaric acid diesters are preferred as the fumaric acid esters of the invention. However, it is possible that at least part of the diesters can be replaced by monoesters and/or their salts, preferably the alkali metal salts such as the sodium salts.

Preferably the fumaric acid ester monomer units are present in amounts of 0.1% to 30% by weight, particularly from 1% to 20% by weight with reference to the weight of the vinyl chloride monomer units in the mixed polymerizates.

In addition to monomer units of vinyl chloride and fumaric acid esters, the mixed polymerizates of the invention may possibly contain up to 20% by weight, relative to the total weight, of other monomer units which are derived from other monomers than the above-identified. Preferably, these other monomer units are vinyl compounds such as vinyl acetate, vinyl laurate and/or vinylidene chloride. However, the presence of such further monomer units in the mixed polymerizates of the invention is generally not desirable.

The mixed polymerizates of the invention can be prepared by means of suspension, emulsion, precipitation or block polymerization with the aid of the known catalysts for the polymerization of vinyl chloride. Due to the fact that in spite of the comparatively simple apparatus required, excellent results are obtained, suspension polymerization, sometimes called "pearl polymerization" is greatly preferred for the preparation of the mixed polymerizates of the invention. Under this procedure, the monomer mixtures of vinyl chloride and fumaric acid esters, whereby part of the ester groups in the fumaric acid esters are derived from monohydric alcohols having aliphatic-unsaturation and at least 11 carbon atoms, are polymerized in a known way. The monomer mixtures of vinyl chloride and the mixed fumaric acid esters of the invention and possibly other monomers, in aqueous dispersion in the presence of dispersing agents while employing monomer-soluble catalysts, are polymerized into polymerization suspensions which quickly settle out after the stirring of the polymerization starting materials which was carried on during the polymerization in order to maintain the dispersion, has come to an end.

For this suspension polymerization those substances can be used which normally are employed as dispersing agents for suspension polymerization. These dispersing agents are mostly protective colloids such as polyvinyl alcohol, which possibly contains up to 40 mol percent of acetyl groups, gelatine and cellulose ether derivatives, such as water-soluble methylcellulose, carboxymethylcellulose, hydroxyethylcellulose, hydroxyethylmethylcellulose and hydroxypropylmethylcellulose, as well as mixed polymerizates of maleic acid or its half esters with styrene or vinyl acetate and vinyl esters of saturated, branched carboxylic acids. The protective colloids are usually employed in amounts of from 0.1% to 1.0% by weight as related to the weight of the monomers.

Anionic, cationic, amphoteric and non-ionic emulsifiers and/or inorganic salts may be used in addition to amounts of from 0.001% to 1% by weight respectively, as related to the amount of the water present in the dispersion.

As examples of anionic emulsifiers are the following: alkali metal and particularly the sodium and potassium salts as well as the ammonium and alkaline earth salts, particularly the calcium salts, of long-chained fatty acids such as lauric acid, stearic acid and isotridencanic acid, of unsaturated long-chained monocarboxylic acids such as oleic acid, of resin acids such as abietic acid, of acid fatty alcohol sulfuric acid esters, of alkylsulfonic acids, of alkylnaphthalenesulfonic acids and of dialkyl esters of sulfosuccinic acid. A good example of a cationic emulsifier is dodecyl-trimethyl-ammonium bromide. A good example of an amphoteric emulsifier is dodecylbetaine. As examples of nonionic emulsifiers are the following: polyoxyethylene ether of alkylphenols and polypropyleneoxide-polyethyleneoxide condensation products. As examples of inorganic salts are sodium sulfate and calcium chloride.

All those polymerization catalysts which can be employed in the suspension polymerization of vinyl chloride may be used within the framework of the present invention as well. As examples for such catalysts are the following: diacyl peroxides such as diacetyl peroxide, didecanoyl peroxide, acetylbenzoyl peroxide, dilauroyl peroxide, dibenzoyl peroxide and bis-2,4-dichlorobenzoyl peroxide; dialkyl peroxide such as di-tert. butyl peroxide; percarbonates such as diisopropyl peroxydicarbonate; percarboxylic acid esters such as tert. butyl perpivalate; mixed anhydrides of organic sulfoper acids with organic acids such as acetylcyclohexanesulfonyl peroxide; as well as azo compound polymerization catalysts such as azobutyric acid dinitrile. Mixtures of such catalysts may be used. Possibly, in addition to the above monomer-soluble catalysts, water-soluble catalysts can be used as well, such as hydrogen peroxide and potassium persulfate. The catalysts can be used in amounts which are common for the supension polymerization of vinyl chloride. In general, these amounts are from 0.00005% to 3% by weight, preferably 0.001% to 0.3% by weight with reference to the total weight of the monomers which are to be polymerized.

Common polymerization adjuvants, aside from those already mentioned, such as particle and molecular size regulators may be used in addition.

The weight relation of water to the monomers to be polymerized is not critical. Generally, the amount of the monomers is from 10% to 60%, particularly 20% to 50% of the total weight of water and monomers.

Preferably, the pH value of the polymerization starting recipe is between 4 to 10. The polymerization temperature is preferably approximately 30° to 80° C.

The polymerization is carried out with as much stirring as is required to maintain the dispersion of the monomers in the aqueous medium as is common in the suspension polymerization of vinyl chloride.

The polymerizates of the invention are particularly suitable for thermoplastic forming, that is, whenever heat and pressure are applied, for instance, by means of calandering, extruding, deep drawing, die-casting or pressure molding, with or without plasticizers, to produce foils, foil tubes, plates and containers, particularly for food stuffs.

The following examples are illustrative of the practice of the invention. They are not, however, to be deemed limitative in any respect.

EXAMPLE 1

250 parts by weight of water, 0.47 part by weight of polyvinyl alcohol having remaining acetyl groups with the saponification number of 100 (milligram KOH, required for the cleavage and neutralization of the remaining acetyl groups in 1 g. of polyvinyl alcohol), 1 part by weight of the sodium salt of a sec.-alkane sulfonate prepared by reaction of a mixture of saturated hydrocarbons with 12 to 18 carbon atoms with sulfur dioxide and chlorine and saponification of the thus obtained sulfochlorides with sodium hydroxide, 0.05 part by weight of calcium chloride as well as 0.3 part by weight of dilauroyl peroxide and 0.27 part by weight of diisopropyl peroxydicarbonate, dissolved in 16.25 parts by weight of fumaric acid diester of a mixture of primary alcohols were charged in a stirrer autoclave line with a refined steel. The fumaric acid diester of a mixture of primary alcohols had an iodine number of 45 to 50 and consisted mainly of oleyl alcohol, cetyl alcohol and myristyl alcohol. The primary alcohols were prepared by means of catalytic reduction of a sperm fatty acid methyl ester with hydrogen at pressures above 100 atmospheres and at temperatures of 250° C. to 350° C. in the presence of catalysts based on zinc oxide, solid under the trademark "HD-Ocenol 45/50." After evacuation of the air from the autoclave, 109 parts by weight of vinyl chloride were introduced into the autoclave. The polymerization mixture was then heated to 54° C. while being stirred at a rate of 140 rotations per minute, until no further fall in pressure occured. After cooling and venting of the autoclave, the polymerizate is filtered off, washed with water and dried.

EXAMPLE 2

The method described in Example 1 was repeated with the exception that, instead of the 16.25 parts by weight of a fumaric acid diester of a mixture of alcohols with an iodine number of 45 to 50, 16.25 parts by weight of a fumaric acid diester of a mixture of alcohols, having an iodine number of 5 was utilized. The fumaric diester utilized consisted of 87.5 parts by weight of a diester of saturated primary tallow fatty alcohols with 14 to 18 carbon atoms and 12.5% by weight of a diester of the mixture of alcohols, having an iodine number of 45 to 50, as described in Example 1.

Comparison experiment A

The method as described in Example 1 was repeated with the exception that in place of the 16.25 parts by weight of a fumaric acid diester of a mixture of alcohols, having an iodine number of 45 to 50, 16.25 parts by weight of a fumaric acid di-(2-ethylhexyl)-ester (iodine number: 0) was utilized (20 carbon atoms).

Comparison experiment B

The method described in Example 1 was repeated with the exception that, in place of the 16.25 parts by weight of a fumaric acid diester of a mixture of alcohols, having an iodine number of 45 to 50, 16.25 parts by weight of a fumaric acid diester of a mixture of saturated, primary tallow fatty alcohols with 14 to 18 carbon atoms (iodine number: 0) were utilized (32 to 40 carbon atoms).

Comparison experiment C

The method described in Example 1 was repeated with the exception that, in place of 16.25 parts by weight of a fumaric acid diester of a mixture of alcohols, having an iodine number of 45 to 50, 16.25 parts by weight of a fumaric acid diester of chemically pure cetyl alcohol (iodine number: 0) were utilized (36 carbon atoms).

One sample of each of the polymerizates which were obtained in accordance with Examples 1 and 2, as well as the comparison experiments A, B and C, was prepared as a foil after being admixed with 2% by weight, as related to the weight of that respective sample of dibutyl tin dimercaptide and 1% by weight, as related to the weight of that respective sample, of a wax (consisting substantially of a mixture of metal soaps and glycol esters of montanic acid with the following characteristic values: drip point according to Ubbelohde: 100° C. to 104° C.; solidification point: 78 to 83; acid number: 10 to 15; saponification number: 105 to 120; ester number: 95 to 105; unsaponifiable matter: 7% to 10%; specific gravity at 20° C.: 1.03 to 1.04, as lubricant. The foils were prepared in a press with 10 minutes at 150° C. and 200 atmospheres pressure.

In the following table the properties of these foils are listed.

TABLE

| Example of experiment | Tensile strength, kg./cm.$^2$ | Breaking elongation, percent | Clarity visual | Percent light absorption |
|---|---|---|---|---|
| 1 | 357–451 | 80–140 | Glass clear | 7.5 |
| 2 | 398–434 | 107–125 | ____do____ | 6.5 |
| A | 335–356 | 108–125 | Cloudy | 9 |
| B | 285–317 | 25–29 | Slightly cloudy | 8 |
| C | 276–298 | 17–20 | ____do____ | 8.5 |

The preceding specific embodiments are illustrative of the practice of the invention. It is to be understood, however, that other expedients known to those skilled in the art or disclosed herein may be employed without departing from the spirit of the invention.

We claim:
1. Mixed polymerizates forming clear molded bodies of high tensile strength and elasticity, containing (1) from 80% to 100% by weight of a copolymerizate of from 70% 99.9% by weight of vinyl chloride and from 0.1% to 30% by weight of fumaric acid diesters of aliphatic alcohols having from 11 to 26 carbon atoms, from 99% to 50% by weight of said aliphatic alcohols being alkanols and from 1% to 50% by weight of said aliphatic alcohols being monohydric aliphatically unsaturated alcohols and (2) and 0 to 20% by weight of vinyl compounds other than vinyl chloride.

2. The mixed polymerizates of claim 1 wherein said fumaric acid diesters of aliphatic alcohols consists essentially of from 98% to 50% of fumaric acid diesters of alkanols having from 11 to 26 carbon atoms and from 2% to 50% of fumaric acid diesters of alkenols having from 12 to 26 carbon atoms.

3. In the process of preparing mixed polymerizates which form clear molded bodies of high tensile strength and elasticity, containing (1) from 80% to 100% by weight of a copolymerizate of from 70% to 99.9% by weight of vinyl chloride and from 0.1% to 30% by weight of fumaric acid diesters of aliphatic alcohols having from 11 to 26 carbon atoms and (2) from 0 to 20% by weight of vinyl compounds other than vinyl chloride which comprises the steps of reacting a mixture of the monomers in an aqueous dispersion under suspension polymerization conditions and recovering said mixed polymerizate, the improvement which comprises utilizing fumaric acid diesters of aliphatic alcohols having from 11 to 26 carbon atoms wherein from 1% to 50% by weight of said aliphatic alcohols are monohydric, aliphatically unsaturated alcohols and from 99% to 50% by weight of said aliphatic alcohols are alkanols.

References Cited

UNITED STATES PATENTS 3,027,358  3/1962  Ebersbach et al. _____ 260—78.5

JOSEPH L. SCHOFER, Primary Examiner

J. KIGHT III, Assistant Examiner